United States Patent [19]
Kendall

[11] Patent Number: 5,141,373
[45] Date of Patent: Aug. 25, 1992

[54] FLUSH BREAKING INTERFERENCE FIT BLIND FASTENER

[76] Inventor: James W. Kendall, 15 Severin Place, Huntington, N.Y. 11743

[21] Appl. No.: 567,934

[22] Filed: Aug. 15, 1990

[51] Int. Cl.⁵ .................. F16B 21/00; F16B 13/04
[52] U.S. Cl. ........................... 411/43; 411/69; 411/70; 411/339; 403/408.1
[58] Field of Search ................. 411/34–38, 411/41, 43, 69, 70, 55, 338, 339; 403/408.1

[56] References Cited

U.S. PATENT DOCUMENTS

| | | | |
|---|---|---|---|
| 3,302,510 | 2/1967 | Gapp | 411/43 |
| 3,369,289 | 2/1968 | Gapp | 411/43 |
| 4,451,189 | 5/1984 | Pratt | 411/43 |
| 4,627,775 | 12/1986 | Dixon | 411/43 |
| 4,810,142 | 3/1989 | Briles | 411/43 |
| 4,826,372 | 5/1989 | Kendall | 411/43 |

Primary Examiner—Neill R. Wilson
Attorney, Agent, or Firm—Beehler & Pavitt

[57] ABSTRACT

A pull-type blind fastener for installation in aligned bores in juxtaposed workpieces to be joined has a sleeve, a pin through the sleeve, and a barrel on the pin between a pin head and the sleeve. The pin is pulled into the sleeve by an installation tool to expand the sleeve and make an interference fit with the workpieces, the barrel forms a blind side retaining bulb on the sleeve, and a selectively annealed zone on the pin shank elongates to accommodate different workpiece thicknesses within a grip range of the fastener. The annealed zone remains exterior to the workpieces to preserve integrity of the interference fit. The installation force deforms a head on the sleeve into engagement with a stop shoulder on the pin to stop a pin break neck in flush breaking relationship with the head.

26 Claims, 3 Drawing Sheets

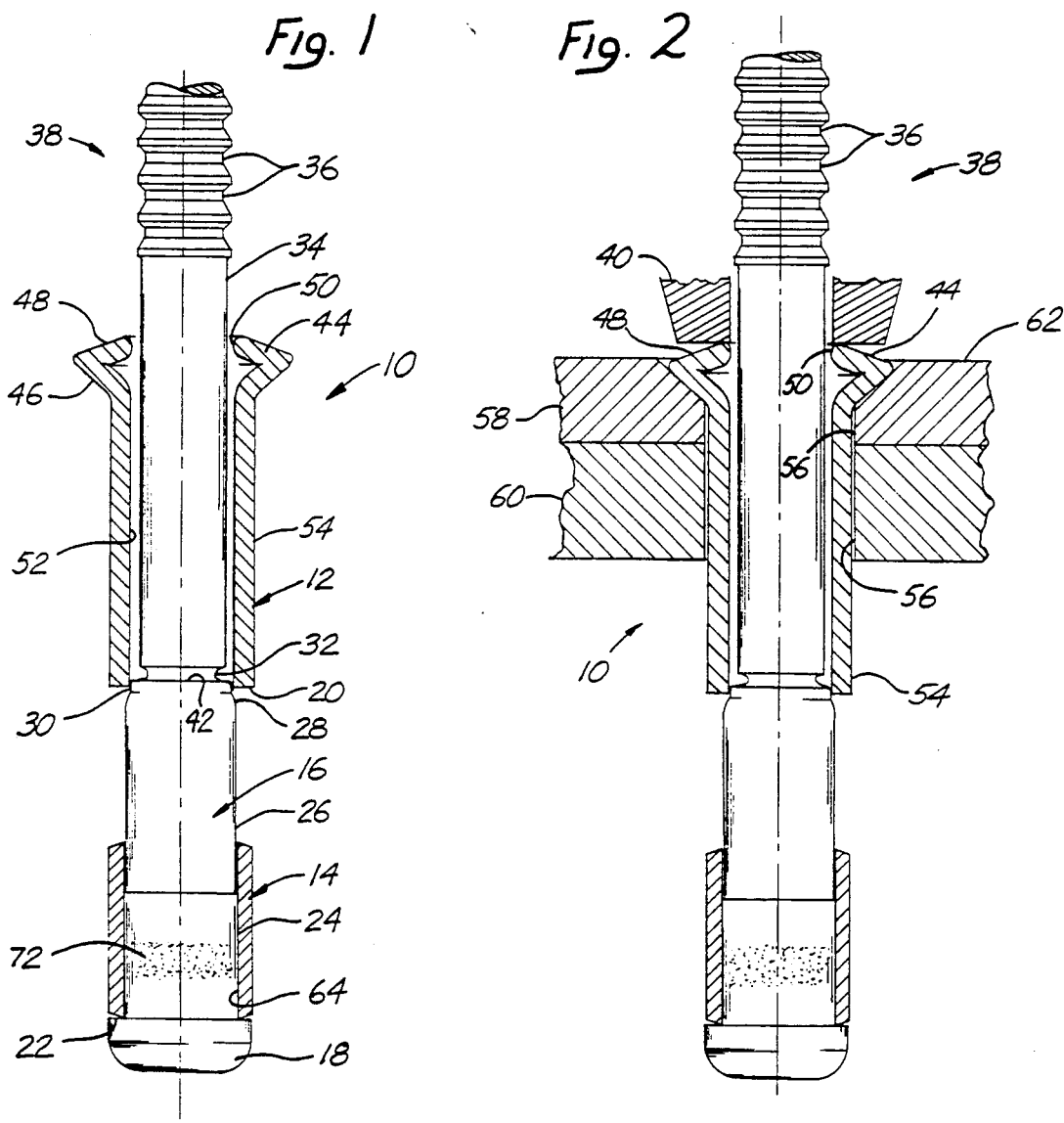

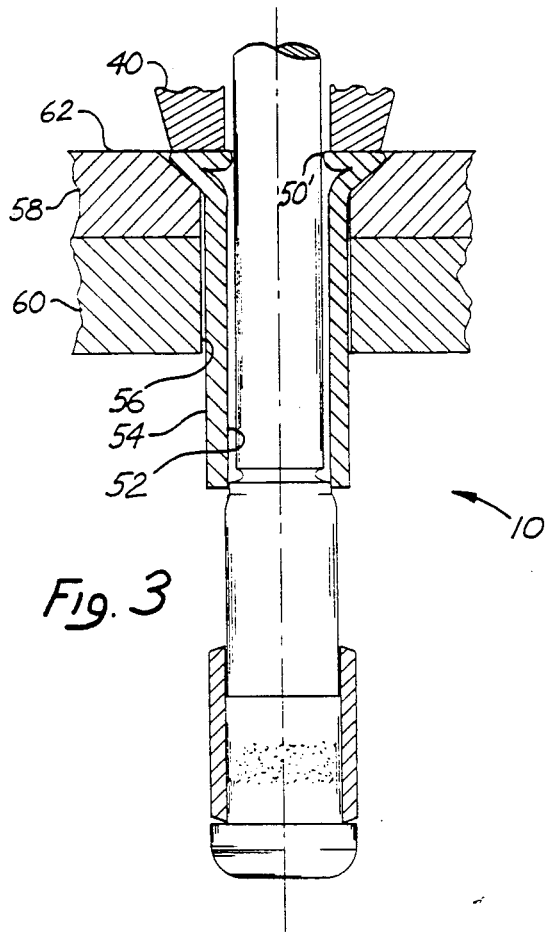
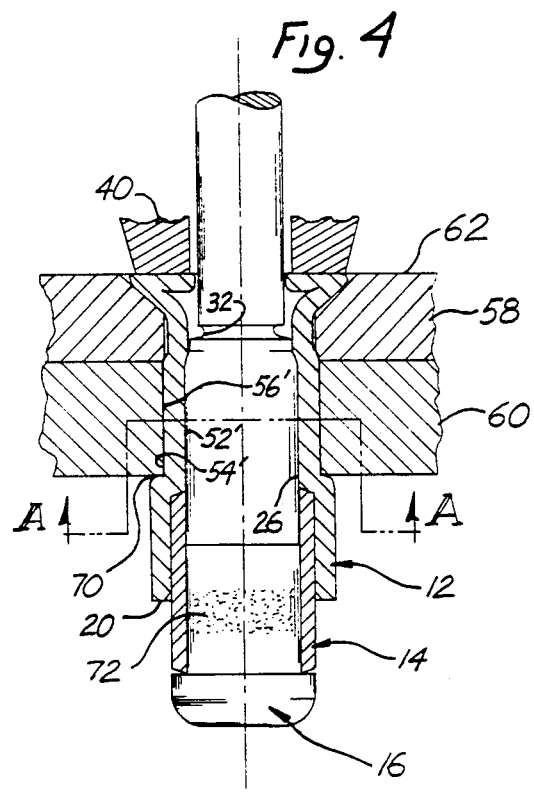
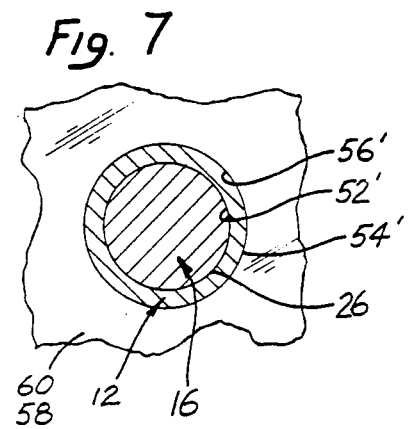

FLUSH BREAKING INTERFERENCE FIT BLIND FASTENER

BACKGROUND OF THE INVENTION

1. Field of the Invention

The present invention pertains generally to the field of fasteners and is more particularly directed to a pull type blind fastener adapted for interference fit applications while providing grip thickness accommodation for the materials being joined and also providing for flush breaking pin positions.

2. State of the Prior Art

Fasteners that provide interference fit to the workpieces in which they are installed produce improved fatigue properties in the joint structure and provide a more rigid, tighter structure and produce leak-proof fastener installations. This is a rather easy task for bolts and the like which are simply forced into a structure hole which is a controlled amount smaller than the bolt diameter thus creating interference. These however, are not blind fasteners as the bolt is solid and guarantees retained interference as installed.

Blind fasteners on the other hand are multiple piece constructions that have as their primary components a hollow sleeve and a central pin portion moveable within the sleeve with or without additional parts and features that function to create a blind head on the inaccessible side of the workpiece upon installation. Blind fasteners adapted for interference fit conditions must in their installed condition act as a solid mass within the stretched installation hole in much the same manner as the solid bolt shank does to maintain the required interference fit.

The amount of interference required in the joint structure is important criteria and should be controlled from both high and low limits. The low limit is controlled such that the minimum level of desired interference is obtained in the joint for its structural benefits whereas the high limit must be controlled to the extent that the fasteners can be successfully installed and no damage to the structure occurs. Important criteria in the performance of blind fasteners in interference fit conditions are consistency of function and inspectability of installed units. Existing fastener designs suffer from significant drawbacks in these respects as illustrated in the following examples;

A first type is a variant of the popular NAS1675 threaded blind bolt series known commercially as Jo-Bolts or Visu-Loks. The variant consists of a tapered shank which when forced into a matingly prepared tapered hole in the structure produces an interference fit. The preparation of the specially reamed, tapered holes is a difficult and costly procedure. It is also difficult to inspect the accuracy of the prepared, tapered hole.

In application the tapered shank of the fastener is placed in the tapered hole wherein the manufactured head of the fastener sits slightly off the sheet line as a function of the interfering tapers. Upon installation the tapered shank must be forced into the tapered hole such that radially outward expanding interference is created and the fastener head seats flush with the workpiece. On these types of systems the force required to seat the fastener head and create the interference should be provided solely by the fasteners installation squeezing action as the blind head is formed since external pushing or bucking to seat the fastener can result in separation of the structure materials being joined. However, the fastener's installation squeezing action often lacks sufficient strength to fully seat the manufactured head and provide the proper level of interference. This results in improper fastener installations which must be removed and replaced, a practice that is particularly dangerous to the tapered holes Differences in structure materials or hardness conditions of same further aggravate the ability of the fastener to function in a consistent and predictable manner. A second type as exemplified by U.S. Pat. No. 3,820,297 to Hurd overcomes the problems associated with preparation of tapered holes. In this fastener the pull stem is drawn into the sleeve with a first interference fit. The resulting sleeve expansion radially outwardly creates a second interference fit to the structure hole in which it is installed.

Although these fasteners perform adequately their teachings and applications are narrowly limited to structure materials having strength levels approximate to or greater than that of the fastener sleeve member. Should these fasteners be installed in structures of significantly greater strength or hardness the sleeve will extrude before the structure hole will be stressed into interference. On the other hand should the same fasteners be installed in structures of significantly lower strength or hardness, the pin component will continue to move axially thru the sleeve, compressing and extruding the blind side of the work surface at the hole edge. Thus the strength of the structure materials controls significantly the proper operation of this device. In actual practice the fastener is fabricated to perform only in a specific structure condition by fine tuning installation loads, i.e. sleeve hardness, pin break load, lubricant coefficient of friction etc. Thus the fastener is suitable only for a specific material, material hardness condition and material thickness. It will not perform adequately if applied to other material types or hardness conditions.

An additional problem associated with fasteners of this type is that the pin break position on installed fasteners is controlled significantly by the structures blind side resistance to further travel of the pin. This means that variables in sheet thickness such as within the fasteners operative grip range result directly in variables in pin position protrusion on installed fasteners. These protrusions must be shaved off after installation to provide aerodynamic smoothness. The shaving operation is not only difficult and costly to perform on the high hardness alloy steel pins of these teachings but is also a dangerous practice that can lead to damaged structure skins. As noted the pin position is controlled significantly by the blind side sheet line. Another major contributing factor however to the installed fastener pin position is the frictional forces caused by drawing the pin into the interference fit. Fasteners of this type which lack positive mechanical stopping means, but rather rely heavily upon frictional forces to limit pin travel exhibit a significant degree of pin position inconsistencies. On blind fasteners it is particularly desirable to provide a means of inspection on the accessible side of the workpiece as an indicator of proper or improper blind head formations since otherwise the blind side configuration is not discernable to the installer. The use of a range of specified acceptable and un-acceptable pin positions as an inspection device for blind fasteners is a well known and accepted practice in the art. However, the combined affects of blind side sheet line variables and frictional forces on the pin positions of fasteners mentioned above severely compromise the integrity of their inspectability.

A final problem to be considered in the application of any blind fastener to be adapted for interference fit applications is that of compounding tolerance build-up conditions. By way of comparison a solid shank fastener such as a bolt must contend with only two tolerance factors when creating an interference fit, i.e. the tolerance of the bolt shank and the tolerance of the installation hole. Blind fasteners on the other hand, even in the most simple two piece constructions must contend with four compounding tolerance factors, i.e. pin shank, the sleeve I.D., the sleeve O.D. and finally the installation hole tolerance itself. Swings of tolerance build-up in one direction can cause over-interference and excessive fastener installation loading. Swings of tolerances in the opposite direction can prevent the proper interference from occurring and result in lessened fastener installation loads such that high, unacceptable pin positions can result. An attending problem is that blind fasteners are installation formed and the forming loads can therefore be compounded with loads created by swings in tolerances. Unlike solid shank fasteners such as bolts, blind fasteners must form their own head on the in-accessible side of the workpiece and typically provide for stem break-off. Thus blind fasteners have their own installation load characteristics with or without additional compounding loads that are caused by tolerance variables as applied to interference fit applications.

Efforts to produce predictable blind fasteners for interference fit applications have been frequently frustrated due to the sums of the compounding loads and fits involved. This has caused a need to tighten tolerances to a point where only highly precise and expensive manufacturing methods such as a reaming, honing and grinding can adequately achieve the specified limits. Even then swings of tolerances can occur within the tightly specified limits and cause fastener malfunctions. This is particularly true of fasteners that rely heavily upon friction to stop the pin at its proper break-off position.

A continuing need therefore exists for predictable flush breaking blind fasteners which provide a controlled amount of interference fit to the structures in which they are installed. A further need is that the fastener remain operative in different materials and material hardness conditions. Such an improved fastener should be simple and inexpensive to manufacture with a minimum number of parts. It is further desirable to make the fastener parts from raw materials and by manufacturing processes which minimize tolerance criticality problems.

SUMMARY OF THE INVENTION

The present invention addresses these and other shortcomings of prior art fasteners by providing a pull type blind fastener having a sleeve of continuous inner diameter with a sleeve head formed at one end, a pin axially slideable through the sleeve, and a non-collapsible barrel that is secured between the sleeve's blind end and a head portion on the pin. Unlike previously known pull-type blind fasteners, the pin stretches in a pre-determined zone to accommodate differences in workpiece thickness. The zone in which the pin stretches is contained within the non collapsible barrel and is always located beyond the blind side sheet line of the workpieces being joined. This allows the pin and sleeve cross-sectional areas that are located within the workpiece bores to be sized to a degree that produce a predetermined, guaranteed interference fit between the installed fastener and the hole in which it is installed. The sleeve head is deformable and folds inwardly upon application of the relative pulling force so as to engage a stop element on the pin thereby limiting axial travel of the pin through the sleeve thus cooperating with the controlled pin stretching to provide variable grip thickness accommodation while ensuring flush pin break positions on installed fasteners.

In a presently preferred embodiment, an installed fastener assembly is desired to provide a minimum interference fit equal ¾ of 1% greater than the maximum recommended hole size in which the fastener is installed. As an example, a recommended hole size for a 3/16 fastener is 0.187/0.189 inches. Thus the 3/16 fastener when installed must stretch the structure hole thru interference to a minimum diameter of 0.1904 inches, (0.189 × 1.0075 = 0.1904). It is further desired that the 3/16 fastener slideably fit into the prepared hole and produce the desired interference fit during its installation stroke. Therefore, with a given hole size of 0.187/0.189 the fastener shank diameter (i.e. sleeve O.D.) in a preferred embodiment would be 0.1845/0.1865 diameter. This includes a clearance of 0.0005" between the maximum fastener shank diameter or sleeve O.D. (0.1865) to the minimum hole size (0.1870) to ensure the slideable pre-installed fit.

A sleeve fabrication tolerance of 0.002 is applied thereunder the 0.1865 maximum sleeve O.D. resulting in the preferred shank size of 0.1845/0.1865.

Now therefore a 0.1845/0.1865 diameter fastener slideably fits into a 0.187/0.189 diameter hole and upon its installation stroke, stretches the hole to 0.1904 diameter minimum thus creating the desired interference, this is achieved by providing a pin that has a shank section with a controlled diameter significantly larger than the sleeve inside diameter which it will be drawn into upon installation. As an example, in the 3/16 fastener defined above the sleeve has an I.D. of 0.132/0.134", and the pin shank diameter that will be drawn into the 0.132/0.134 sleeve I.D. would need to be 0.1420 minimum to expand the sleeve sufficiently to achieve an installed shank diameter of 0.1904, when in this example, minimum metal condition tolerances are used; i.e. maximum sleeve I.D. (0.134") and minimum sleeve O.D. (0.1845). By swinging the tolerances to a maximum metal condition i.e. minimum sleeve I.D. (0.132) and maximum sleeve O.D. (0.1865) a pin shank diameter of 0.1375 minimum will expand the sleeve sufficiently to achieve the required interference diameter. The pin shank diameters specified above are obtained by the application of the following simple formula:

$$"Pd" = 2\left(\sqrt{\frac{Aa - (Ba - Ca)}{\pi}}\right)$$

Where

"Pd" = Diameter of pin shank necessary to create interference fit.

Aa = Area of minimum installed fastener diameter.

Ba Area of specific sleeve outside diameter. (uninstalled)

Ca = Area of specific sleeve inside diameter. (uninstalled)

The impact of tolerance build-up can now be seen, whereas in the above example both sleeve I.D. and sleeve O.D. have a 0.002" tolerance applied for manufacturing but result in the need for pin shank diameters 0.0045" different depending on swings of tolerance of the sleeve diameters, i.e. pin=0.1420 diameter for min metal sleeve. Pin=0.1375 diameter for max metal sleeve. It can be further understood that if a pin for min metal sleeve were used in max metal sleeve, over-interference will result: 0.142 pin dia., 0.132 sleeve I.D. and 0.1865 sleeve O.D. 0.1937 installed fastener diameter. Conversely, if a pin for max metal sleeve is used in a min metal sleeve, under-interference will result: 0.1375 pin dia., 0.134 sleeve I.D. and 0.1845 sleeve O.D. 0.1871 installed fastener diameter.

It is therefore an object of this invention to use sleeve raw materials and manufacturing processes that minimize tolerance build-up conditions and to provide a tailor made pin shank diameter for each lot of sleeves based upon their known I.D. and O.D. dimensions rather than on the tolerance provided for their fabrication. The use of continuous wall thickness tubing as a starting material for sleeve fabrication is ideal due to the characteristic consistency of size, thickness and concentricity of such tubing. It is customary to provide liberal tolerances for the manufacture of the tubing i.e. 0.002" for I.D. and O.D. However a continuous fabrication run on the same tube fabrication tooling yields continuous, consistent I.D. and O.D. dimensions with little or no variance. Consistency of I.D. and O.D. sizes are routinely 0.0002" or less.

By using a continuous segregated manufacturing lot of tubing stock and by cutting off short lengths of this tubing, and 11 further forming a sleeve head on one end of the shorter lengths of tubing, finished sleeves can be made that have the ensured consistency of size of the starting tubing stock. No I.D. or O.D. metal removal machining is ever done. (i.e. reaming, honing, or grinding) therefore the wall thickness of the sleeve is that of the starting tubing stock.

Interference fit fasteners are primarily used in demanding aerospace structures where the interference fit not only provides a strong rigid joint but also enhances the ability of the structure (i.e. wing skin or the like) to resist fatigue crack propagation, such as at a fastener hole, and improves significantly the fatigue strength of the structure. Conversely, if isolated fasteners do not produce the required interference fit but are installed in a structure designed for the interference fit condition the structure itself could be fatigue critical and in risk of structural failure. It is therefore of prime importance that those critical fastener dimensions that produce the interference fit be assured. In prior art devices the critical sleeve I.D. and O.D. dimensions were assured only thru random sampling or periodic audit inspections on individual sleeves.

As noted above in the present invention the critical I.D. and O.D. dimensions of the sleeve are that of the starting tubing stock. It is therefore easily possible and practical to monitor, control and record the tubing stock I.D. and O.D. as it is being made. Typical non-destructive measuring via Eddy Current, Ultrasonic, Ultrasonic Wall and Laser devices can monitor and record the dimensional results throughout the entire lengths of tubing stock thus resulting in known dimensional properties of all finished sleeves made from that lot. This greatly improves dimensional reliability over prior art random sampling practices.

The pin is provided with a first shank section located adjacent the pin head that has a pre-finished diameter large enough to be finish ground to the diameter needed to produce the required level of interference in the installed fastener. The finished pin grind diameter is established by the following formula:

$$"Pd" = 2\left(\sqrt{\frac{Aa - (Ba - Ca)}{\pi}}\right)$$

Where

"Pd" = Minimum finished pin grind diameter necessary to create guaranteed interference fit when mated with the specified sleeve dimensions following;

Aa = Area of minimum installed fastener dia. i.e. minimum interference dia.

Ba = Area of specific sleeve outside diameter, i.e. the smallest recorded O.D. measurement within a continuous segregated manufacturing lot of sleeves.

Ca = Area of specific sleeve inside diameter, i.e. the largest recorded I.D. measurement on the same lot of sleeves as used in providing Ba calculation.

The pin diameter Pd thus established is provided a tolerance of +0.0004", −0.0000 for final grinding.

Only a portion of the pins first shank diameter is finish ground to diameter Pd, that being substantially the axial length that is entrapped by interference of the fasteners maximum grip range on the installed fastener. The remaining portion of the pins first shank diameter is left in its larger pre-finished diameter. This larger pre-finished diameter is selectively annealed at approximately mid point of its axial length such that it will readily stretch elastically in the selectively annealed section upon application of sufficient axial load. The annealed section is localized such that no pin softening is created in the pin head or the ground diameter Pd.

A hardened non-collapsible barrel fits slideably upon the pin adjacent the pin head and around the selectively annealed, non-ground first pin shank diameter. The sleeve is then slideably assembled over a free-end pull groove section on the pin such that the blind end of the sleeve in its assembled but not installed condition nearly abuts the leading edge of the ground pin diameter Pd. The pin includes a break notch located adjacent to the leading edge of the ground pin diameter Pd. A second pin shank diameter intermediate to the pull groove and Pd diameters terminates at the break notch. The transition between the second pin shank diameter and the ground diameter Pd at the break-notch results in a substantially square stopping shoulder on the pin. The pin stopping shoulder cooperates with the inwardly folding sleeve head to limit axial travel of the pin thru the sleeve.

The present fastener design optimizes the consistency and reliability of obtaining critical dimensions needed to fabricate a reliable blind fastener for interference fit applications. The use of constant wall thickness, segregated and controlled tubing stock as a starting material for the sleeves totally eliminates expensive close tolerance machining methods such as reaming, honing and grinding, that has been done on similar sleeves of prior art. The combination of using a specially ground pin to mate with a specific lot of sleeves based upon the sleeves known and audited critical I.D. and O.D. dimensions produces a reliable guarantee of the required interference fit and eliminates both under-and-overinterference fit conditions. The combination of the hardened non-collapsible barrel, the controlled pin elastic stretching and the positive mechanical stopping feature creates a reliable blind fastener for interference fit applications that can be applied to structures of differing materials and hardness levels while providing large bearing blind heads throughout the fasteners operative grip range and further provides flush breaking pin positions on installed fasteners. These and other advantages of the present invention will be better understood from the following detailed description of the preferred embodiment considered with reference to the accompanying drawings.

BRIEF DESCRIPTION OF THE DRAWINGS

FIG. 1 — is a longitudinal view partly in section of a blind fastener according to the present invention.

FIG. 2 — is a similar view of the fastener of FIG. 1 disposed within aligned openings in a workpiece to be fasteners, and showing the fastener engaged by the nose of an installation tool preliminary to setting of the fastener.

FIG. 3 — shows the fastener of FIG. 2 in a first intermediate stage of the setting process prior to formation of the blind head.

FIG. 4 — shows the fastener of FIG. 3 in a more advanced intermediate stage of the setting process wherein the blind head has been formed in the fasteners maximum grip condition but with the pin not yet pulled to its flush breaking position.

FIG. 7 — is an axial cross section of the fastener taken along A—A of FIG. 2.

DETAILED DESCRIPTION OF THE PREFERRED EMBODIMENTS

Figure 5:
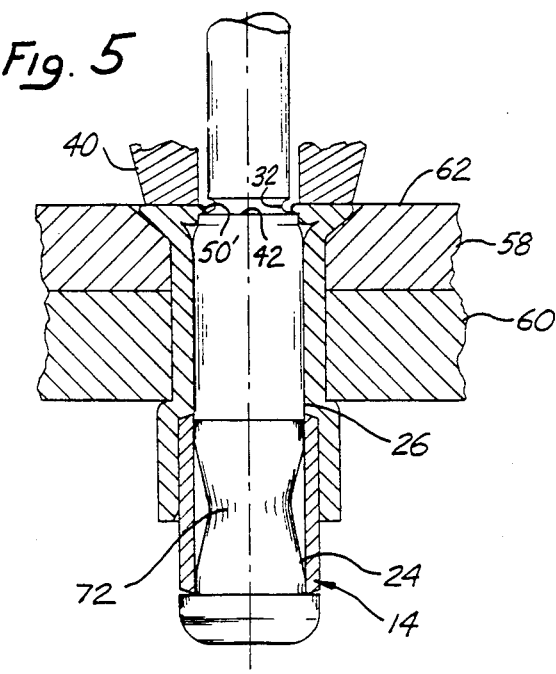
FIG. 5 — shows the fastener of FIG. 4 in a further advanced stage of the setting process as seen in the fasteners maximum grip condition with the pin pulled to the stopping location just prior to breaking the pin off at the breakneck.

With reference to the drawings, FIG. 1 shows a blind fastener 10, constructed according to the present invention. The fastener 10 includes a tubular sleeve 12, a tubular barrel 14 and a pin 16 disposed axially through the barrel 14 and the sleeve 12. The pin 16 includes a generally cylindrical pin head 18 in abutting contact with the tubular barrel 14. The pin head 18 has an annular undersurface 22 which defines a substantially square shoulder with the pin shank. The shank of the pin 16 includes a first shank section 24 adjacent the pin head. The diameter of shank section 24 and the inside diameter 64 of the barrel 14 are sized thereto so as to be a close sliding fit with one another. Shank section 24 has a selectively annealed zone 72 located at approximately mid point of the length of shank section 24 and is concealed within the bore 64 of the tubular barrel 14. A second shank section 26 of the pin is only slightly smaller in diameter to shank section 24 and is located immediately adjacent thereto. In a pre-finished condition the length of shank section 24 encompasses the full axial distance included by shank sections 24 and 26 but in the final finished condition, section 26 is precision ground into the pre-finished section in a method to be more fully described later. The second shank section 26 terminates at a transition radius 28 intermediately positioned between shank 26 and a short pilot diameter 30. The pilot diameter 30 terminates at a breakneck 32 leaving a substantially square stopping shoulder 42 immediately adjacent the pilot diameter 30. A third shank section 34 of the pin extends from the breakneck thru the sleeve to the free end 38 of the pin which includes a plurality of pull grooves 36.

The sleeve has a hollow clamshell shaped head 44 formed at its outer end. Between the blind side end 20 and the sleeve head, the sleeve 12 has a uniform outer diameter 54 and has a smooth internal through-bore 52 of uniform diameter. In the illustrated embodiment the sleeve head 44 is of the countersink style and has a conical undersurface 46. The sleeve head terminates in an outwardly facing end wall defining a generally conical truncated raised abutment 48 centrally apertured by a sleeve head through-bore 50 coaxial with the sleeve bore 52.

Installation of the fastener 10 to make a joint in a workpiece is shown in the sequence comprising FIGS. 2 thru 6. Turning to FIG. 2, the fastener 10 is shown inserted into aligned workpiece bores 56 in juxtaposed workpiece panels 58 and 60 to be joined by means of fastener 10. The bore 56 in the outer panel 62 is shaped to define a conical seat for the undersurface 46 of the sleeve head 44 such that the top of the sleeve head is flush with the outer surface 62 of the workpiece panel 58. The conical abutment 48 projects from the sleeve head top and terminates at the circular edge of bore 50 above the panel surface 62.

The outer pull-grooved portion 38 of the pin stem is engaged by the nosepiece of a conventional single action, pull type installation tool with the driving anvil 40 of the nosepiece bearing against the uppermost end of the raised abutment 48, i.e. against the rim surrounding the sleeve head bore 50. In the initial condition of FIG. 2 the sleeve head 44 only partially contacts the anvil 40 due to the raise abutment 48. While only the nose portion of the installation tool is illustrated, its construction, function and operation are well known in the art. In general the projecting end 38 of the pin is engaged within the installation tool which, when activated, pulls axially on the pin while applying a reaction force against the sleeve head 44 through the nosepiece anvil 40. As shown in FIG. 2, prior to setting the fastener there is a slight clearance between the workpiece bores 56 and the sleeve outside diameter 54 such that the fastener 10 may be slideably inserted into the workpiece bores 56. It is a requisite of fastener 10 that it must upon installation create interference in the workpiece into which it is installed, i.e., workpiece bores 56 must be radially stretched to a pre-determined magnitude to provide the desired fatigue and strength level performance of the structure in which the fastener is installed. The stretched workpiece bore is represented by 56′ in FIGS. 4 and 7, and by the following example as a preferred embodiment.

Bore diameter in workpiece as drilled (inches)=0.187/0.189 dia. Interference required in workpiece hole=¾ of 1% greater than maximum hole size=1.0075× maximum hole size (0.198)=(inches)=0.1904 dia=stretched hole 56′ or expanded fastener outside diameter 54′=0.1904 diameter minimum.

To be practical, successful, and economical a fastening system of this type must provide adequate tolerance for fastener fabrication as well as for the user to prepare the fastener holes in his structure. In this preferred embodiment the sleeve 12 is provided with an inside diameter 52 of 0.132/0.134 inches and an outside diameter 54 of 0.1845/0.1865 inches or 0.002 inch tolerances which are adequate for a number of high production, low cost fabrication methods. However, by selection of fabrication methods that have as their natural attributes a high degree of piece to piece uniformity the known actual dimensions within a lot of sleeves are used to calculate the pin diameter of shank section 26 that will expand the sleeve 12 to the desired installed outside diameter 54', i.e. to produce the magnitude of interference in the structure as expresses as stretched structure bore 56'. As an example, certain fabrication methods that are well known in the art such as extruding, heading or drawing require significant tolerances for set-up or to accommodate the tooling in use however the parts produced in a continuous run on the same tooling will yield virtually identical dimensions piece to piece. The natural attribute of piece to piece consistency is beneficially used in this preferred embodiment to calculate the diameter of pin shank section 26 per fastener lot by the following formula and following example:

$$Pd = 2\left(\sqrt{\frac{Aa - (Ba - Ca)}{\pi}}\right)$$

where

| Print O.D. (Ref) | Print I.D. (Ref) | Audited Actual O.D. (54) | Actual Audited I.D. (52) | Bore in Structure (56) (Ref) | Required Interference Dia. (56') | Dia. "Pd" (Shank 26) |
|---|---|---|---|---|---|---|
| .1845 | .132 | .1852 | .1333 | .187 | .1904 | .1404 |
| .1865 | .134 | | | .189 | | |

Only the shank section 26 of the pin 16 will be precision ground to diameter Pd. The diameter Pd thus established will be ground to a close tolerance, typically +0.0004, −0.0000 however the sleeves dimensions are used as is (as audited). Referring now to FIG. 3, which illustrates a first intermediate stage of the fastener installation, relative pulling force has been applied by the installation tool between the pin and the sleeve head, causing the nose anvil 40 to react against and push inwardly on the raised abutment 48, folding and flattening the raised abutment to an installed condition where the sleeve head 44 has a substantially flat outer face flush with the workpiece face 62. Upon flattening of the conical abutment the sleeve head bore 50 is reduced from its normal aperture to a smaller diameter 50'.

Figure 6:
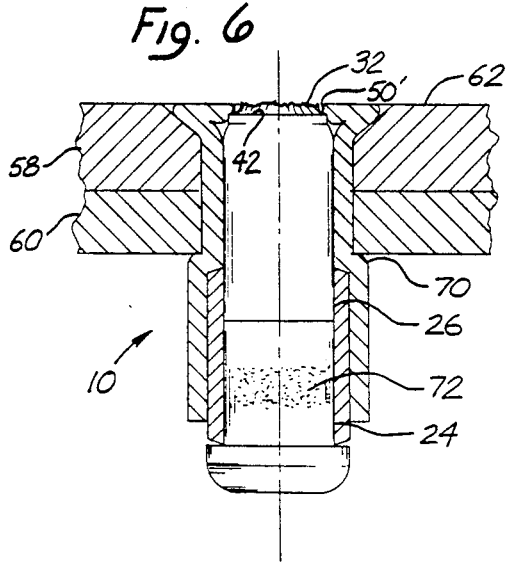
FIG. 6 — shows the same fastener of FIG. 4 fully installed as similar to FIG. 5 but as seen in the fasteners minimum grip range.

Continued pulling force applied by the installation tool as shown in FIG. 4 causes the precision ground shank diameter 26 of the pin to enter and substantially expand the sleeve I.D. to the diameter 52' which in turn creates O.D. expansion to 54' and therefore stretch the structure bores to diameter 56', which is the pre-determined interference fit condition. Fasteners of this type must perform throughout a specified grip range to accommodate differences in the thickness of materials to be joined. These are well understood and common practice in the art. Referring now to the sequence comprising FIGS. 4 through 6 is the novel method by which this invention provides the grip accommodation and creates a flush breaking pin position on the installed fasteners. As can be seen by FIG. 4, as the pin was pulled into the sleeve the barrel 14 entered the blind end 20 of the sleeve 12 substantially expanding the blind end 20 to create a large bearing blind head 70 against the blind, in-accessible side of the workpiece 60. At this point the barrel 14 has created the blind head 70 and further axial travel of the pin 16 is resisted by the cooperative binding between the blind side of workpiece 60 the blind head 70, the sleeve, the barrel 14 and the pin head 18.

The pin is provided with a narrow selectively annealed zone 72 at approximately mid point of the unground pin shank section Continued pulling force on the pin causes an elastic yielding or elongation in the selectively annealed zone 72 The elastic stretching of the pin allows the ground pin shank diameter section 26 to enter the sleeve I.D. in its entirety until the substantially square stop shoulder 42 of the pin contacts and stops against sleeve head material at the reduce aperture 50' of the sleeve head 44. Continued pulling force applied by the installation tool then breaks the pin at the breakneck groove 32 substantially flush with the sleeve head and the outer surface 62 of the workpiece 58 as is shown in FIG. 6.

The elastic yielding in the pin's annealed zone 72 causes typical neck-down or reduction of area as is shown in FIG. 5. This would be detrimental if the reduction of area occurred within the workpiece bores since the ability to provide interference would be compromised. However as shown in FIGS. 5 and 6 the neck down always occurs beyond the blind side of the workpiece 60.

It is necessary to confine the selectively annealed area 72 to a small and narrow heat affected zone at approximately mid point of the underground pin shank section 24 so that no yielding can occur in the precision ground shank section 26 of the pin 16. This is accomplished by using induction heating methods and varying inductor coil sizes and shapes, amount of power and time as well as applying varying methods of heat sinking. These are well known and common practices within the art of induction heating. As noted a number of variables can be adjusted within the induction heating process. These adjustments are advantageously used in this invention whereby the last operation done to the pin is selectively anneal to match the proper function of the assembled components although great care is exercised in precision grinding the pin shank 26 and although the sleeve fabrication methods are selected which have as their natural attributes an extremely high level of piece to piece consistency, some level or dimensional tolerance build-up does occur Further tolerances exist in the basic metallurgy of the fastener components themselves, either in chemical composition or in their hardness values which culminate from induced cold work hardening, heat treat response or a combination of both. It is therefore highly desirable to have a practical means of accommodating and adjusting for those tolerance impacts on a lot by lot basis. This is provided by the advantageous use of the set up variables offered by the use of induction heating. FIG. 5 shows the fastener applied to a maximum grip thickness condition of the workpieces. In this condition maximum elastic yielding of the selectively annealed area 72 will occur. FIG. 6 illustrates the fastener applied to a minimum grip thickness condition of the workpieces. In this condition little or no elastic yielding of the selectively annealed area 72 will occur. In any condition above the fastener's minimum grip thickness, the amount of pin elongation through elastic yielding will increase as the grip thickness increases up through and including the maximum grip thickness condition.

In certain applications it is highly desirable that the fastener feature a self-inspecting or "Flagging" device. The term flagging is well understood in the art to define a condition whereby the fastener will selectively malfunction in the event of improper fastener use, selection, or quality problem associated with a specific fastener installation which is not otherwise apparent to the installer. The fastener if properly installed will show a pin broken off substantially flush with the outer face of the sleeve head as is shown in FIG. 6. If a particular fastener is set with the pin broken in a position which is not substantially flush, the particular fastener should be considered an improper fastener installation and should be removed and replaced. These are well known and accepted practices in the art and the range of acceptable and unacceptable installed pin positions are specified for each fastener size within a family of fasteners. Referring now to FIG. 6 which shows the fastener as properly installed in its minimum grip condition, cooperative binding between the sleeve blind head, the barrel, the pin head 18 and the blind side of workpiece 60 exists at the same time that the mechanical stop is created by abutment of the stop shoulder 42 and the reduced aperture bore 50'. This is also true for FIG. 5 in which the fastener is shown in its maximum grip condition. In either event the sizes of aperture 50' and the stopping shoulder 42 have been carefully designed so that the mechanical stop created thereby will not alone by itself prevent the pin from pulling through to a substantially high position above the sleeve head and top of work surface 62. It is necessary to have the cooperative binding of the blind head, barrel etc. at the same time as mechanical stopping occurs since it takes the combination of those resistive forces to stop the pin properly for flush pin break. Referring again to FIG. 6, if the workpiece thickness was significantly less than as shown the blind head would not be in abutment against workpiece 60 and the pin would continue to pull beyond the mechanical stop thereby flagging the improper application condition. Conversely if the workpiece thickness were significantly greater than the proper max grip thickness (FIG. 5) the blind head would bind pre-maturely and require an excessive amount of pin stretching through the annealed zone 72 to engage the stop shoulder. This abnormal amount of pin stretching will induce an elastic failure fracture through the annealed zone 72. Thus the pin will then pull through to a high pin, flagging condition.

Important criteria for the design of pin 16 are the selection of materials, conditions, sizes and response to induction heating variables such that adequate elastic yielding and elongation is present to accommodate the grip range of the fastener, as well as to ensure that an abnormal amount of stretching will induce elastic failure thus causing the flagging feature. A-286 CRES material conforming to ASTM 5737 in the fully cold worked and thermally aged condition has been found to be adequate when subjected to the advantageous use of the induction heating variables.

Figure 8A:
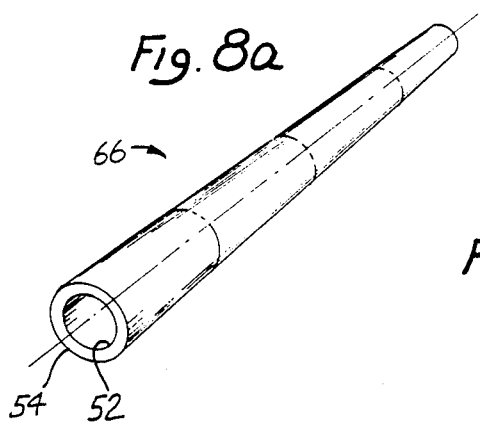
FIG. 8a, 8b, and 8c — illustrates the sleeve fabrication process from first longer sections of continuous wall thickness tubing stock 8a, to cut sleeve blank length 8b to the sleeve 8c thus formed from the cut blank.
Figure 8B:
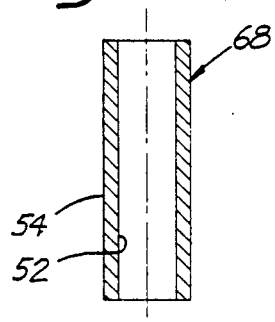
Figure 8C:
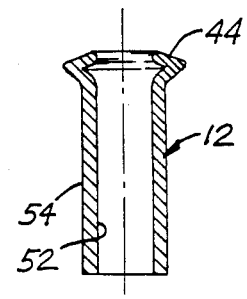

FIG. 8 and the sequence 8a through 8c illustrates how sleeves for the fastener can be readily made from long lengths of tubing 66, cut to smaller blanks 68 and formed into finished sleeves 12. Thus the natural attribute of piece to piece consistency may be achieved without costly drill, ream or grind operations. Other adequate sleeve fabrication methods include eyelet forming, progressive cold heading, and extruding which are well known and understood but are not illustrated here.

The fastener disclosed herein can be manufactured by more efficient and economic use of materials than has been possible in the past. The pin, sleeve, and barrel can be made of similar materials with little or no costly and wasteful drilling or other metal cutting operations while advantageously using the natural attribute of piece to piece consistency of the methods selected, through the use of the customized grind operation and the variables of induction heating to guarantee fastener performance on a lot by lot basis. The novel means of providing grip accommodation without sacrifice of interference properties while providing the user with a flush breaking inspectable pin position, and flagging features to self inspect conditions of improper installation provides end users with a reliable and practical blind fastener for creating fatigue resistant interference fit joints.

While a preferred embodiment of the invention has been shown and illustrated for purposes of explanation and clarity, it must be understood that still other changes, modifications and substitutions to the described embodiment can be made by those possessed of ordinary skill in the art without departing from the spirit and scope of the present invention which is defined only by the following claims.

I claim:

1. A pull-type blind fastener for installation in aligned bores in juxtaposed workpieces to be secured to each other, comprising:
   a sleeve having a blind-side end and a sleeve head at an opposite end;
   a pin having a pin shank extending through said sleeve and a pin head on a blind side end of said shank;
   means for forming a blind side retaining bulb on said sleeve responsive to differential pulling force applied between said pin and said sleeve head by an installation tool thereby to secure said workpieces between said sleeve head and said bulb; and
   a selectively annealed zone on said pin shank adapted to elongate under sufficient pulling force on said shank to accommodate different workpiece thicknesses within a grip range of the fastener;
   wherein said annealed zone remains exterior to said bores on the blind side of said workpieces after said retaining bulb is formed.

2. The fastener of claim 1 further comprising means for stopping axial movement of said pin through said sleeve in response to said pulling force at a flush breaking position with said sleeve head.

3. The fastener of claim 2 wherein said means for stopping comprise a portion of said sleeve head defining a sleeve head bore, said portion being deformable from a normal condition to an installed condition of reduced aperture responsive to said pulling force, stop shoulder means on said pin engageable with said portion, and break neck means adjacent to said stop shoulder means.

4. An interference fit pull-type blind fastener for installation in aligned bores in juxtaposed workpieces being secured to each other, comprising:
- a sleeve having a blind-side end and a collapsible sleeve head at an opposite end;
- a pin having a pin shank extending through said sleeve and a pin head on a blind side end of said shank; and
- a barrel on said shank between said pin head and said sleeve;
- said shank including:
  - a first shank section adjacent said pin head and including a selectively annealed zone contained within said barrel;
  - a second shank section intermediate said first shank section and said blind side end of the sleeve;
  - a third shank section extending through said sleeve and said sleeve head with a plurality of pull grooves exterior to said sleeve head for engagement by an installation tool;
  - said second shank section having a diameter greater than the inside diameter of said sleeve for expanding the outside diameter of said sleeve to make an interference fit with said workpieces in said bores upon being pulled into the sleeve by an installation tool applying differential pulling force between said pin shank and said sleeve head, said barrel cooperating with said sleeve to form a blind-side retaining bulb thereby to secure said workpieces between said sleeve head and said bulb, said annealed zone stretching to accommodate different workpiece thicknesses within a fastener grip range.

5. The fastener of claim 4 characterized in that first shank section remains exterior to said workpieces after formation of said bulb within said grip range so that said annealed zone does not weaken said interference fit.

6. The fastener of claim 4 further comprising a break neck between said second and third shank sections, a stop shoulder between said break neck and said pilot diameter, and means on said sleeve head deformable by said differential pulling force for engaging said stop shoulder to stop said break neck at a flush breaking position with respect to said sleeve head.

7. The fastener of claim 6 further comprising:
- a pilot diameter between said second shank section and said break neck, said pilot diameter making a close fit with the interior diameter of said sleeve for centering said second shank section into said sleeve, and a transition radius between said pilot diameter and said second shank section for facilitating advance of said second shank section into said sleeve.

8. An interference fit pull-type fastener for installation in aligned bores in juxtaposed workpieces to be secured to each other, comprising:
- a sleeve having a blind-side end and a sleeve head at an opposite end;
- a pin having a pin shank extending through said sleeve and a pin head on a blind side end of said shank, said pin shank including pull groove means engageable by an installation tool for pulling said pin into said sleeve, and a pin shank section of enlarged diameter for expanding the outside diameter of said sleeve upon being pulled thereinto to make an interference fit in said bores with said workpieces;
- means for forming a blind side retaining bulb on said sleeve responsive to said pulling of said pin thereby to secure said workpieces between said sleeve head and said bulb; and
- a selectively annealed zone on said pin shank adapted to elongate under sufficient pulling force on said shank to accommodate different workpiece thicknesses within a grip range of the fastener; wherein said annealed zone remains exterior to said workpieces so as not to weaken said interference fit.

9. An interference first pull-type blind fastener for installation in aligned bores in juxtaposed workpieces to be secured to each other, comprising:
- a sleeve having a blind-side end and a sleeve head at an opposite end;
- a pin having a pin shank extending through said sleeve and a pin head on a blind side end of said shank, said pin shank including means engageable by an installation tool for pulling said pin into said sleeve, and a pin shank section of enlarged diameter for expanding the outside diameter of said sleeve upon being pulled thereinto to make an interference fit in said bores with said workpieces;
- a barrel between said pin head and said sleeve cooperating with said sleeve for forming a blind side retaining bulb on said sleeve responsive to pulling of said pin thereby to secure said workpieces between said sleeve head and said bulb; and
- a selectively annealed zone on said pin shank disposed within said barrel and adapted to elongate under sufficient pulling force on said shank to accommodate different workpiece thicknesses within a grip range of the fastener, said annealed zone remaining exterior to said workpieces so as not to weaken said interference fit.

10. An interference fit pull-type blind fastener for installation in aligned bores in juxtaposed worpieces to be secured to each other, comprising:
- a sleeve having a blind-side end and a sleeve head at an opposite end;
- a pin having a pin shank extending through said sleeve and secured to said blind side end of said sleeve;
- first means for expanding the outside diameter of said sleeve for making an interference fit with said workpieces within said bores responsive to differential pulling force applied between said pin and said sleeve head by an installation tool;
- second means for forming a blind side retaining bulb on said sleeve thereby to secure said workpieces between said sleeve head and said bulb;
- a portion of said pin shank adapted to elongate under sufficient pulling force on said shank to accommodate different workpiece thicknesses within a grip range of the fastener; and
- a portion of said sleeve head defining a sleeve head bore, said portion being deformable from a normal condition to an installed condition of reduced aperture responsive to said pulling force, stop shoulder means on said pin engageable with said portion, and break neck means adjacent to said stop shoulder means such that movement of said pin through said sleeve is stopped with said break neck in flush breaking relationship to said sleeve head.

11. An interference fit pull-type blind fastener for installation in aligned bores in juxtaposed workpieces being secured to each other, comprising:

a sleeve having a blind-side end and a collapsible sleeve head at an opposite end;

a pin having a pin shank extending through said sleeve and a pin head on a blind side end of said shank; and a barrel on said shank between said pin head and said sleeve;

said shank including:

a first shank section adjacent said pin head and including a selectively annealed zone contained within said barrel;

a second shank section intermediate said first shank section and said blind side end of the sleeve, said second shank section having a diameter greater than the inside diameter of said sleeve;

a third shank section having a diameter lesser than the inside diameter of said sleeve, said third shank section extending through said sleeve and said sleeve head with a plurality of pull grooves exterior to said sleeve head for engagement by an installation tool;

a pilot diameter between said second shank section and said break neck, said pilot diameter making a close fit with the interior diameter of said sleeve for centering said second shank section into said sleeve, and a transition radius between said pilot diameter and said second shank section for facilitating advance of said second shank section into said sleeve;

said second pin shank section expanding the outside diameter of said sleeve to make an interference fit with said workpieces in said bores upon being pulled into the sleeve by the installation tool applying differential pulling force between said pin shank and said sleeve head, said barrel cooperating with said sleeve to form a blind-side retaining bulb thereby to secure said workpieces between said sleeve head and said bulb, said annealed zone stretching to accommodate different workpiece thicknesses within a fastener grip range;

a break neck between said second and third shank sections, a stop shoulder between said break neck and said pilot diameter, and means on said sleeve head deformable by said differential pulling force for engaging said stop shoulder to stop said break neck at a flush breaking position with respect to said sleeve head.

12. A pull-type blind fastener for installation in aligned bores in juxtaposed workpieces to be secured to each other, comprising:

a sleeve having a blind-side end and a sleeve head at an opposite end;

a pin having a pin shank extending through said sleeve and a pin head on a blind side end of said shank;

an axially noncollapsible barrel on said shank between said pin head and said sleeve for deforming said sleeve to make a blind side retaining bulb on said sleeve responsive to differential pulling force applied between said pin and said sleeve head by an installation tool thereby to secure said workpieces between said sleeve head and said bulb; and a selectively annealed zone on said pin shank in said barrel adapted to elongate under sufficient pulling force on said shank to accommodate different workpiece thicknesses within a grip range of the fastener.

13. The fastener of claim 12 wherein said annealed zone remains exterior to said bores on the blind side of said workpieces after said retaining bulb is formed.

14. The fastener of claim 12 wherein said annealed zone remains contained within said noncollapsible barrel after said retaining bulb is formed.

15. The fastener of claim 12 further comprising means for stopping axial movement of said pin through said sleeve in response to said pulling force at a flush breaking position with said sleeve head.

16. The fastener of claim 15 wherein said annealed zone is adapted to allow movement of said pin to a flagging position past said flush breaking position in the event said pin is overstretched beyond said grip range.

17. A pull-type blind fastener for installation in aligned bores in juxtaposed workpieces to be secured to each other, comprising:

a sleeve having a blind-side end and a sleeve head at an opposite end;

a pin having a pin shank extending through said sleeve and a pin head on a blind side end of said shank;

means for deforming said sleeve to make a blind side retaining bulb on said sleeve responsive to differential pulling force applied between said pin and said sleeve head by an installation tool thereby to secure said workpieces between said sleeve head and said bulb; and said pin head being deformable for stopping axial movement of said pin through said sleeve in response to said pulling force at a flush breaking position with said sleeve head;

characterized in that said pin head is adapted to allow movement of said pin to a flagging position past said flush breaking position absent binding of said retaining bulb against a blind side of said workpieces.

18. A pull-type blind fastener for installation in aligned bores in juxtaposed workpieces to be secured to each other, comprising:

a sleeve having a blind-side and a sleeve head a an opposite end;

a pin having a pin shank extending through said sleeve and a pin head on a blind side end of said shank;

means for deforming said sleeve to make a blind side retaining bulb on said sleeve responsive to differential pulling force applied between said pin shank and said sleeve head by an installation tool thereby to secure said workpieces between said sleeve head and said bulb;

said pin shank including a first portion adjacent to said pin head and adapted to elongate under pulling force to accommodate workpieces of different thicknesses within an installation grip range of said fastener, and a second portion intermediate said first portion and said sleeve and having an initial diameter greater than the inside diameter of said sleeve thereby to expand the outside diameter of said sleeve to make an interference fit with said workpieces in said bores.

19. A pull-type blind fastener for installation in aligned bores in juxtaposed workpieces to be secured to each other, comprising:

a sleeve and a pin slidable through said sleeve, means on said pin for deforming a blind side end of said sleeve to make a retaining bulb responsive to differential pulling force applied between said pin and said sleeve by an installation tool thereby to secure said workpieces between said bulb and a head on said sleeve;

said pin being adapted to elongate within a predetermined zone located outside said bores under pulling force to accommodate workpieces of different thicknesses between said retaining bulb and said sleeve head.

20. The fastener of claim 19 said pin having an initial diameter dimensioned for expanding the outside diameter of said sleeve to make an interference fit with said workpieces in said bores.

21. The fastener of claim 19 further comprising an axially noncollapsible barrel on said pin and wherein elongation of said pin occurs exclusively within said barrel.

22. The fastener of claim 19 wherein said pin elongates from a minimum grip to a maximum grip of the fastener, there being little or no pin elongation at said minimum grip.

23. The fastener of claim 22 wherein said pin is adapted to elastically fail and break at an elongation of approximately 1.5 times the elongation at said maximum grip.

24. The fastener of claim 19 wherein said differential pulling force can be applied by either a single action or a double action installation tool.

25. A three piece interference fit blind fastener of the type wherein a pin is pulled by an installation tool through a tubular sleeve for expanding the outside diameter of the sleeve in aligned bores of juxtaposed workpieces to be secured to each other, comprising:

a tubular sleeve having a sleeve head at one end, a pin extending axially through said sleeve and having means engageable by an installation tool for pulling said pin through said sleeve, said pin having an integral shank section of enlarged diameter internally to said sleeve for expanding the outside diameter of said sleeve, and an axially rigid noncollapsible barrel element retained on said pin for deforming said sleeve to make a retaining bulb thereon when the pin is pulled; and a heat treated zone on said pin within said barrel susceptible to elastic stretching for accommodating different workpiece thicknesses between said bulb and said sleeve head, characterized in that said stretching takes place only within said barrel and outside of the workpiece bores thereby to preserve the integrity of the joint.

26. The fastener of claim 25 wherein said sleeve head is deformable by said installation tool to an installed condition engageable with stop means on said pin for stoping axial movement of said pin through said sleeve with a break neck on said pin in flush breaking relationship with said sleeve head.

* * * * *